United States Patent [19]
Pierson et al.

[11] Patent Number: 5,488,929
[45] Date of Patent: Feb. 6, 1996

[54] DISPOSABLE CAT LITTER BOX LINER

[76] Inventors: Susan K. Pierson, 1001 C. Kingswood Dr., Chapel Hill, N.C. 27514; Stacy S. Pierson, 4800 University Dr. Apartment 24D, Durham, N.C. 27707

[21] Appl. No.: 350,945

[22] Filed: Dec. 7, 1994

[51] Int. Cl.$^6$ ................................................ A01K 29/00
[52] U.S. Cl. .................................................... 119/170
[58] Field of Search ........................... 119/165, 167, 119/168, 170; 383/20, 17, 7, 120; 229/117.07, 103, 186, 117.03

[56] References Cited

U.S. PATENT DOCUMENTS

| | | |
|---|---|---|
| 1,102,445 | 7/1914 | Schwab . |
| 2,141,438 | 12/1938 | Hirsch . |
| 2,657,849 | 11/1953 | Paul et al. . |
| 3,476,303 | 11/1969 | Smith . |
| 3,684,155 | 8/1972 | Smith . |
| 4,782,788 | 11/1988 | Arcand ................................. 119/168 |
| 4,819,793 | 4/1989 | Williard et al. ................... 383/17 X |
| 5,046,457 | 9/1991 | Ashcroft et al. ................... 119/168 |
| 5,129,364 | 7/1992 | Pirkle . |
| 5,144,914 | 9/1992 | Giannakopoulos . |
| 5,167,205 | 12/1992 | Bell et al. . |
| 5,249,550 | 10/1993 | Hines et al. ....................... 119/165 X |

FOREIGN PATENT DOCUMENTS

| | | | |
|---|---|---|---|
| 2613693 | 10/1988 | France .................................. 119/168 |
| 3117900 | 11/1982 | Germany ............................. 119/170 |
| 2228254 | 8/1990 | United Kingdom ................. 119/168 |
| 2250672 | 6/1992 | United Kingdom ................. 119/168 |

*Primary Examiner*—Thomas Price
*Attorney, Agent, or Firm*—Bell, Seltzer, Park & Gibson

[57] ABSTRACT

A disposable cat litter box liner formed of flexible sheet material, preferably paper, is adapted to assume a generally flat configuration prior to use, a generally box-shaped configuration upon insertion into a cat litter box for holding litter therein, and a generally bag-shaped configuration upon removal from the litter box for disposing of the litter therein. The liner includes an arrangement of fold lines associated with the end panels for permitting the liner to be folded into a generally flat configuration prior to use. The liner includes a pair of elongate opposite top panels, which can advantageously include handles to facilitate lifting of the liner. When the top panels are clasped together and the liner lifted thereby with cat litter in the receptacle, the bottom panel collapses downward, the side panels collapse inward, and the liner assumes a generally bag-shaped configuration for disposal of cat litter therein.

21 Claims, 5 Drawing Sheets

DISPOSABLE CAT LITTER BOX LINER

FIELD OF THE INVENTION

The present invention relates to litter box liners in general, and particularly relates to litter box liners that may be formed of paper and may assume a flat configuration prior to use, a box-shaped configuration during use, and a bag-shaped configuration for disposal of litter therein after use.

BACKGROUND OF THE INVENTION

Litter pans or boxes are employed with numerous animals, particularly domestic pets such as cats. The litter generally provides an absorbent function, and may also provide a deodorant function, but does little to combat the bacterial and other microbiological contaminants that the used litter can carry. Hence, regular disposal of contaminated litter, which might otherwise become a disease vector, is necessary.

Disposal of litter after use is a generally unpleasant task. The fine particulate litter itself can spill, generate dust, and be difficult to handle; manipulating the litter in a manner that avoids contact with germs or other potential disease-causing microorganisms (particularly important for pregnant women or those with weakened immune systems) can be cumbersome; and the task must be regularly and repeatedly performed or the litter will become overly contaminated and all of the foregoing problems will be exacerbated.

U.S. Pat. No. 5,167,205 to Bell and Kheradpir utilizes a self-contained, stand alone product that includes and is shipped with clay manufactured from two corrugated boards or similarly stiff material. This device provides a stiff moisture barrier floor that is covered with a moisture repellent coating. It does not provide a liner that can be used with a box, does not provide a liner that can be used with other commercially available cat pans and litter, and is intended for frequent disposal of the entire pan assembly.

U.S. Pat. No. 3,684,155 to Smith discloses a collapsible sanitary container and liner combination that utilizes a plastic liner bag for the receptacle. A disadvantage of this design is that it employs a specially designed litter pan, and that the liner therefor must be constructed of disposable plastic by virtue of the pan design. A disadvantage of disposable plastic is that it tends to be ripped and torn by cats that have claws.

In view of the foregoing, a first object of the present invention is to provide a cat litter box liner that can be used with other commercially available litter boxes.

A second object of the present invention is to provide a litter box liner that is of a simple design.

A third object of the present invention is to provide a litter box liner that can be made of paper or other flexible and collapsible material, and that can be made from recycled paper or recyclable paper if so desired.

A fourth object of the present invention is to provide a litter box liner that can assume a compact shape prior to use to facilitate storage thereof.

A fifth object of the present invention is to provide a litter box liner that is formed of a material that can be used to easily dispose of litter after use.

SUMMARY OF THE INVENTION

In accordance with the foregoing, a disposable cat litter box liner formed of flexible sheet material is provided herein. The liner is adapted to assume a generally flat configuration prior to use, a generally box-shaped configuration upon insertion into a cat litter box for holding litter therein, and a generally bag-shaped configuration upon removal from the litter box for disposing of the litter therein.

The liner has a bottom panel having opposite side edge portions and opposite end edge portions. A pair of opposite end panels are foldably connected to the bottom panel end edge portions, each of the opposite end panels terminating at a top edge portion. A pair of elongate opposite side panels are foldably connected to the bottom panel side edge portions, with each of the side panels having a top edge portion. The side panels and the end panels are connected to one another to form a continuous uninterrupted side wall connected to the bottom panel, the wall forming with the bottom panel a receptacle for holding cat litter therein when the liner is inserted in a litter box.

The liner includes an arrangement of fold lines that provide fold means associated with the end panels for permitting the liner to be folded into a generally flat configuration prior to use.

The liner includes a pair of elongate opposite top panels, each of the top panels foldably connected to one of the side panels at the side panel top edge portions, with the top panels extending above the side panel top edge portions. When the top panels are clasped together and the liner lifted thereby with cat litter in the receptacle, the bottom panel collapses downward, the side panels collapse inward, and the liner assumes a generally bag-shaped configuration for disposal of cat litter therein.

BRIEF DESCRIPTION OF THE DRAWINGS

The foregoing and other objects and aspects of the present invention are explained in detail in the specification set forth below and the drawings herein, in which.

DETAILED DESCRIPTION OF THE PREFERRED EMBODIMENT

Figure 1:
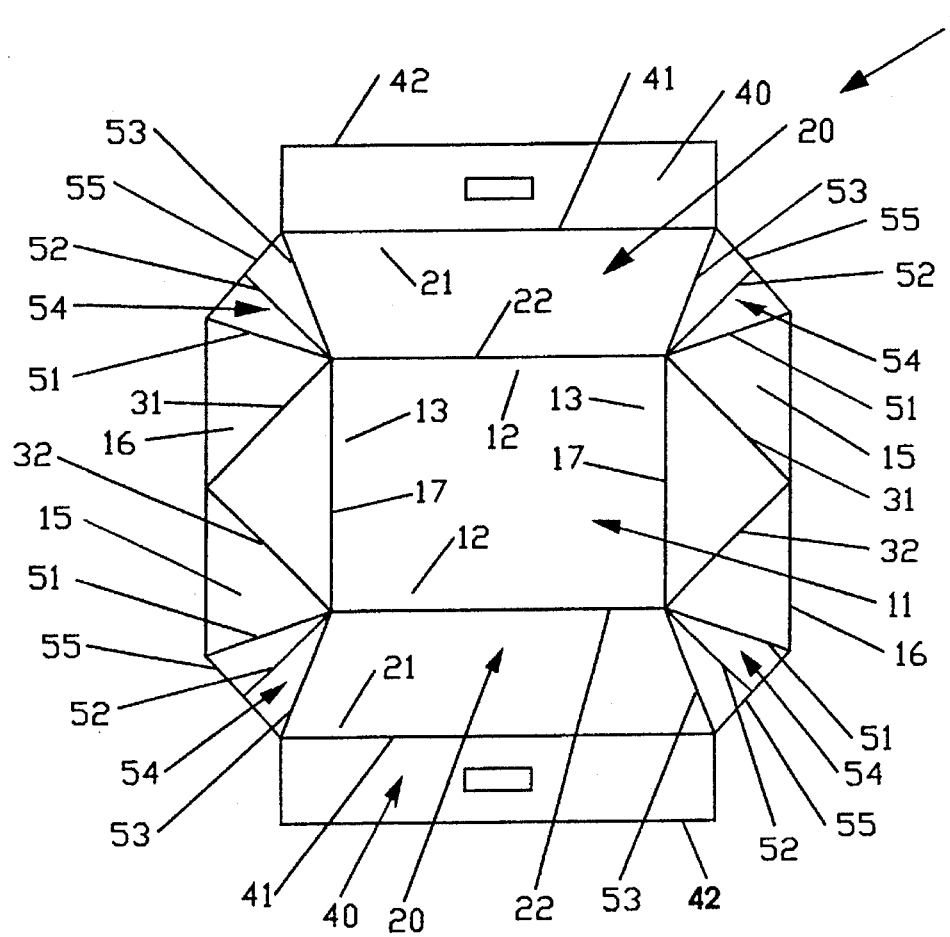
FIG. 1 is a top plan view of a blank used to make a litter box liner of the present invention.
Figure 2:
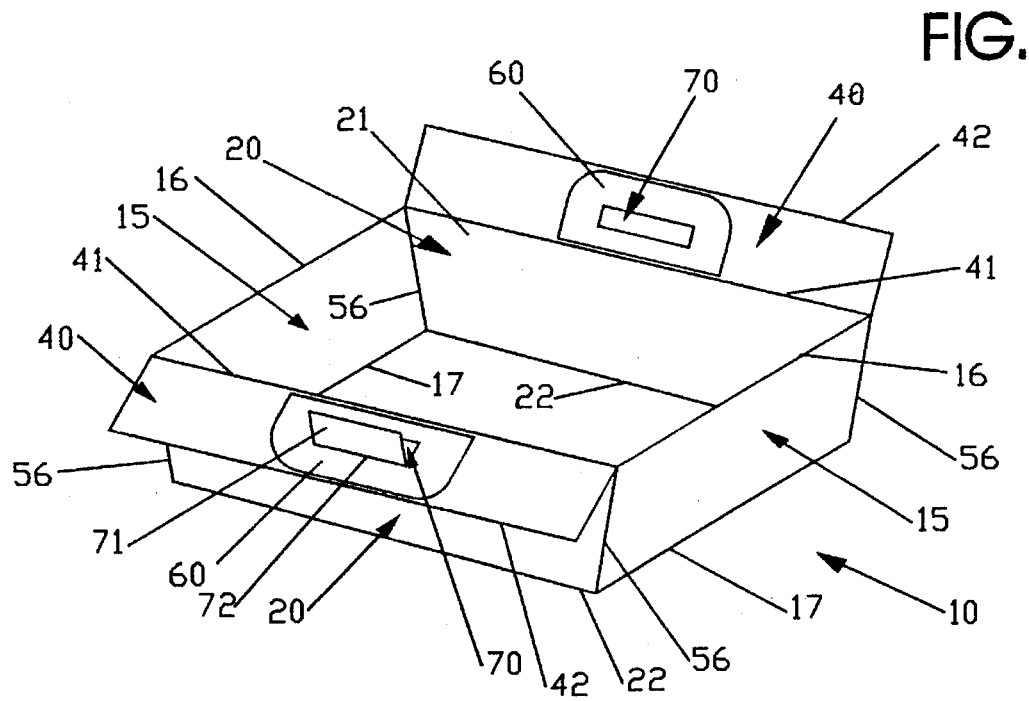
FIG. 2 is a perspective view of a litter box liner of the present invention.

A liner of the present invention is formed of flexible sheet material such as paper. In contrast to rigid materials such as cardboard or corrugated cardboard, such flexible sheet material can bend and drape without forming a crease or fold line therein. The entire liner may be formed of a single continuous sheet or blank, as illustrated in FIG. 1. The sheet material may be single or multiple ply. The sheet material is preferably paper, such as recycled or recyclable paper. Most preferably, the liner is formed of a double ply (i.e., two layers) of brown paper, of the same type conventionally used in the manufacture of paper grocery bags or yard refuse bags, or any other similar durable paper. Where multiple layers of paper are employed, the layers may be fastened together by any suitable means, such as by a glue or adhesive layer therebetween, by tape along the peripheral edge thereof, by mechanical fastening means such as stitching or folding, etc. The paper material may be laminated with a water-repellent or resistant material or provided with a water-repellent coating, if desired. Each layer of paper may be a single sheet of paper, or may be a multiple sheet of paper joined along a seam line.

A preferred embodiment of the invention is set forth in FIGS. 1–5. The liner 10 has a bottom panel 11 having opposite side edge portions 12 and opposite end edge portions 13. The bottom panel 11 is generally rectangular in shape.

A pair of opposite end panels 15 that are generally rectangular in shape (trapezoidal in shape in the preferred embodiment) are foldably connected to the bottom panel end edge portions 13 along a fold line 17, each of the opposite end panels terminating at a top edge portion 16. Note that, in the preferred embodiment, the opposite end panels 15 terminate at the end panel top edge portions 16. A pair of elongate opposite side panels 20 that are generally rectangular in shape (also trapezoidal in shape in the preferred embodiment) are foldably connected to the bottom panel side edge portions 12 along a fold line 22, with each of the side panels having a top edge portion 21. The side panels and the end panels are connected to one another to form a continuous uninterrupted side wall connected to the bottom panel, the wall forming with the bottom panel a receptacle for holding cat litter therein when the liner is inserted in a litter box. In a preferred embodiment, the circumference of the wall is greater around top edge portions 16, 21, 16, 21 than it is around the bottom wall edge portions 12, 13, 12, 13 to provide an outwardly-tapering, or outwardly sloped, side wall (best shown in FIG. 2). When the receptacle is empty the outwardly-tapering side wall feature makes filling the receptacle with litter easier, and when filled with litter, this feature serves to facilitate the receptacle being maintained in an open configuration by the weight of the litter pressing against the side wall therein. This feature may be achieved by making either or both of the generally rectangular side panels and end panels trapezoidal in shape, as noted above.

Figure 3:
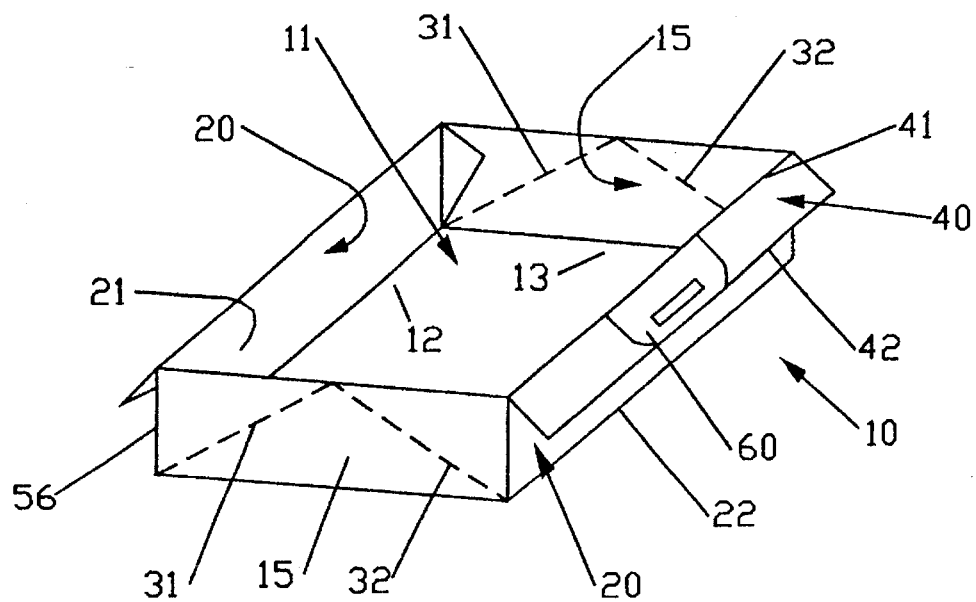
FIG. 3 is a perspective view of a litter box liner of the present invention, with the fold lines formed in the end panels illustrated by dashed lines.
Figure 4:
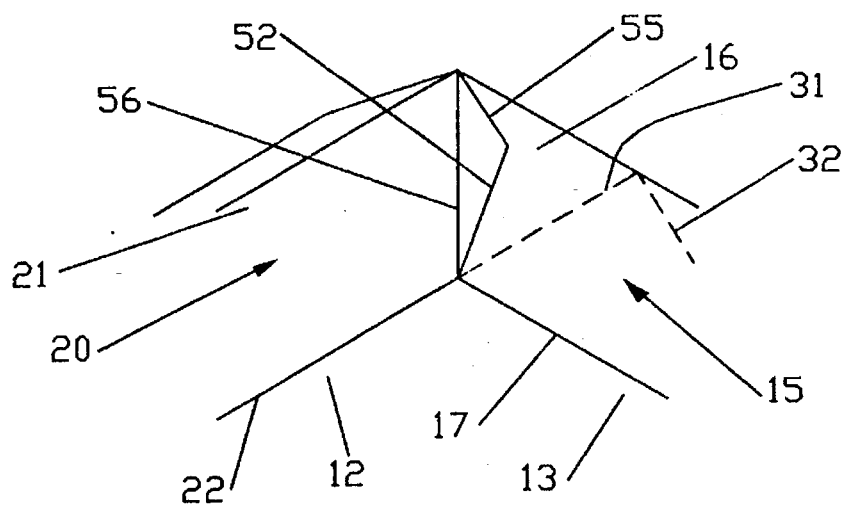
FIG. 4 is a detail perspective view of an interior corner portion of a litter box liner of the present invention.
Figure 5:
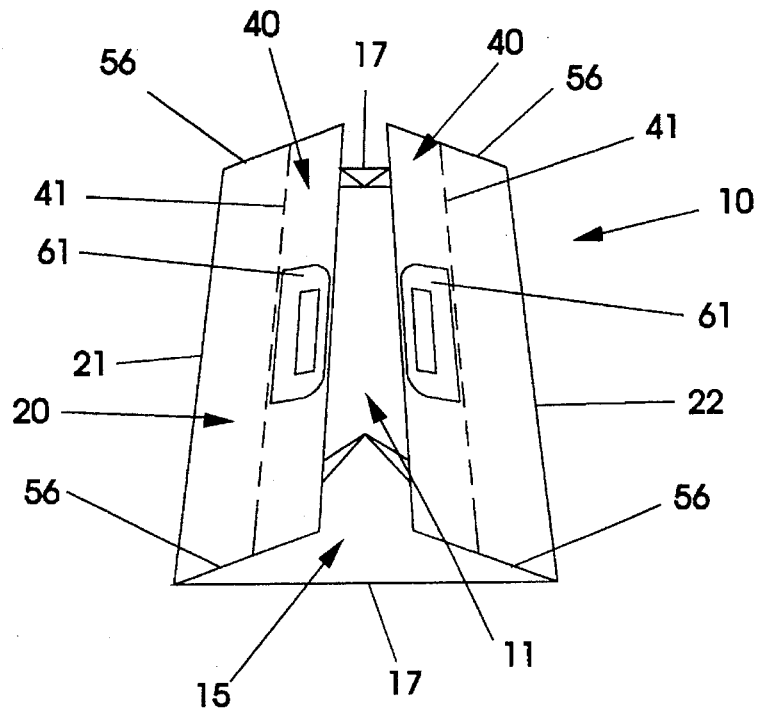
FIG. 5 is a perspective view of a litter box liner of the present invention in a partially folded position.
Figure 6:
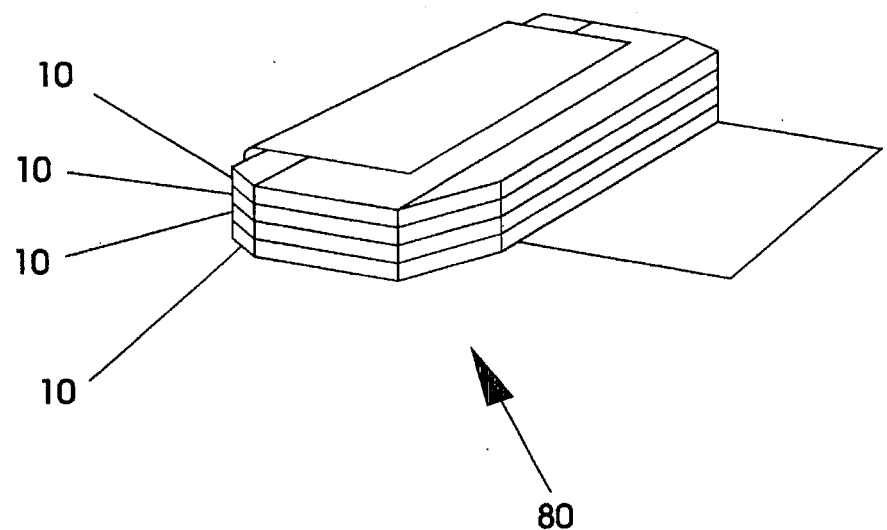
FIG. 6 is a perspective view of a plurality of litter box liners of the present invention in a fully folded and stacked position prior to use.

As shown in FIGS. 1, 3 and 4, the liner includes an arrangement of fold lines 31, 32 that provide fold means associated with the end 15 panels for permitting the liner to be folded into a generally flat configuration prior to use. As illustrated in FIG. 5 and FIG. 6, the fold lines are configured for permitting the liner to be folded with the end panels overlying the bottom panel and the side panels overlying the end panels, and thereby overlying the bottom panel. Other fold means may also be employed and the particular arrangement of fold lines is not critical: all that is desired is that the liner be capable of being folded to achieve a generally flat configuration prior to use.

Figure 10:
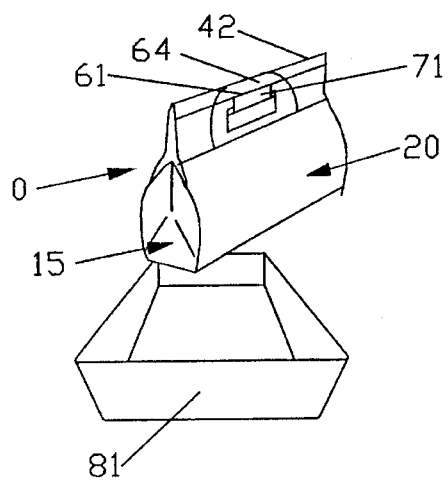
FIG. 10 is a schematic illustration of a litter box liner of the present invention being removed from a litter box after use, showing the bottom panel collapsing downward and the liner assuming a bag-shaped configuration for disposal.
Figure 11:
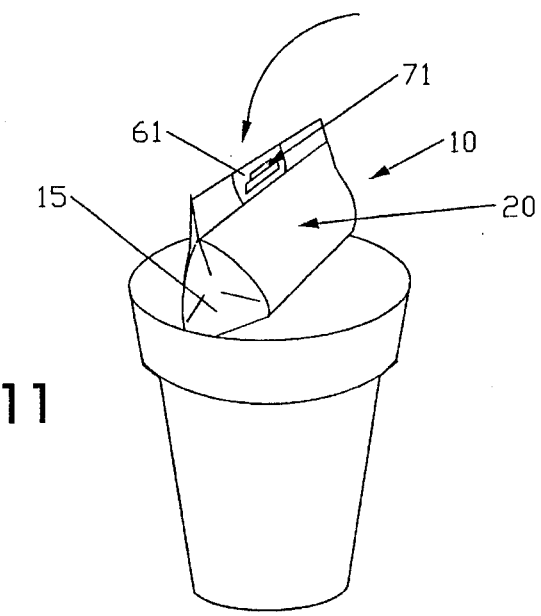
FIG. 11 is a schematic illustration of a litter box liner of the present invention, now in a bag-shaped configuration containing used litter, being disposed of after use.

The liner includes a pair of elongate opposite top panels 40, each of the top panels foldably connected along a fold line 41 to one of the side panels 20 at the side panel top edge portions 21. The top panels terminate at a top panel edge portion 42. Note that the top panels 40 extend above the end panel top edge portions 16. As shown in FIGS. 10–11, When the top panels 40 are clasped together and the liner lifted thereby with cat litter in the receptacle, the bottom panel 11 collapses downward, the side panels 20 collapse inward, and the liner assumes a generally bag-shaped configuration for disposal of cat litter therein.

In constructing the liner from a blank, the blank is provided with fold lines 51, 52, 53 in each of the four corners thereof. fold lines 51, 53 define a triangular corner section 54 bisected by fold line 52, which corner section 54 terminates in an upper edge portion 55. To assemble the liner from the blank and form a corner 56 in the liner as shown in FIG. 4, an upward fold is formed along fold lines 51 and 53, a downward fold is formed along fold line 52, the outer surfaces of the now bisected triangular section are mated together to form a flattened flap, and the flap secured to the inner surface of end panel 15. Securing of the flap to the inner surface can be accomplished by any suitable technique, such as adhesive tape or glue, with transparent adhesive tape currently preferred.

A pair of rigid cardboard rigidifying members 60, 61 secured to the inner and outer surfaces, respectively, of each of the top panels 40 provides a rigidifying means associated with at least one, and preferably both, of the top panels for facilitating the carrying of the liner when the top panels are clasped together and the liner lifted thereby. Numerous other rigidifying means may also be employed, such as a single rigidifying member on both top panels, a pair of rigidifying members on one top panel, or a single rigidifying member on one top panel. The shape of the rigidifying member is not critical, and can optionally be configured to overlie a greater or lesser portion of the top panel than as shown in the preferred embodiment. Rigidifying members formed of materials other than cardboard, such as multi-layered laminated paper, plastic, or particleboard, may also be employed. Rigidifying means other than cardboard members can be employed, such as one or more strips of tape extending along the length of top panel edge portions 42, or impregnating of the panels with a rigidifying material, or laminating the panels with a rigidifying material. Preferably the rigidifying member is made of natural or recyclable materials such as cardboard. In a preferred embodiment, strips of transparent tape 64 are folded over the top panel edge portion 42 along the length of the top panels 40.

An opening 70 formed in both of the top panels 40 and rigidifying members 60, 61 provides a handle means connected to or formed in at least one of the top panels. Numerous other handle means may also be employed, such as laminating a cord or rope member made of paper or other suitable material to one or both of the top panels, laminating a cardboard member to one or both of the top panels that extends above the top panels, with the opening formed in the portion of the cardboard member extending above the top panels, etc.

A flap 71 connected to one of the top panels along fold line 72 provides a closure means connected to at least one of the top panels for joining the top panels to one another. The flap 71 can be conveniently manufactured in the liner by simply cutting along three sides of opening 70 and leaving the fourth side uncut to provide fold line 72, with the remaining material that would otherwise be removed to form the opening 70. In use, as best shown in FIGS. 10 and 11, the flap is inserted through the opening 70 in the opposite top panel when the top panels are clasped together and folded upward to facilitate securing the top panels together. Numerous alternate closure means can also be employed, such as one or more strips of transparent tape provided attached to or otherwise operatively associated with the liner, ties connected to the top panels for tying the top panels together, string associated with the liner, contact adhesive deposited on the inner surface of one or both of the top panels (with or without a masking strip cover) for adhering the top panels to one another, self-adhering strips such as VELCRO™ brand self-adhering strips attached to the opposite top panels, etc.

Figure 7:
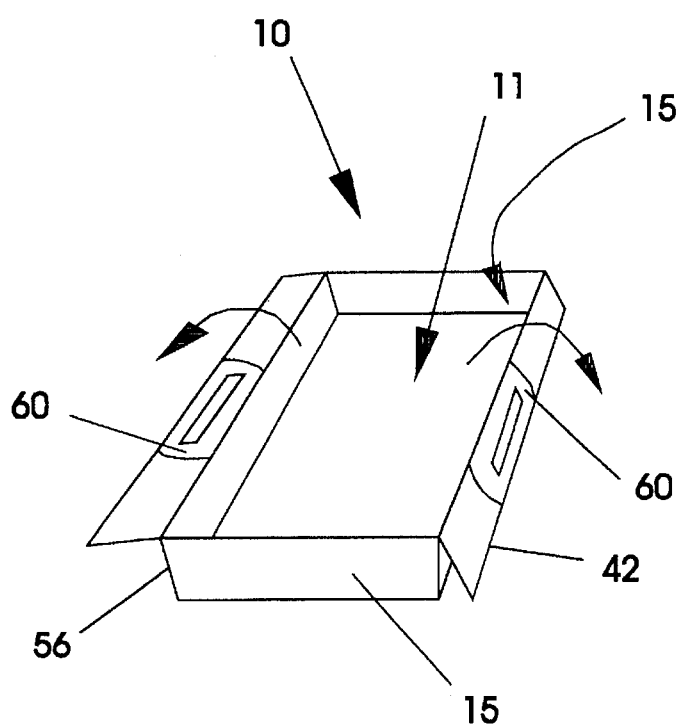
FIG. 7 is a schematic illustration of a litter box liner of the invention being opened for use.
Figure 8:
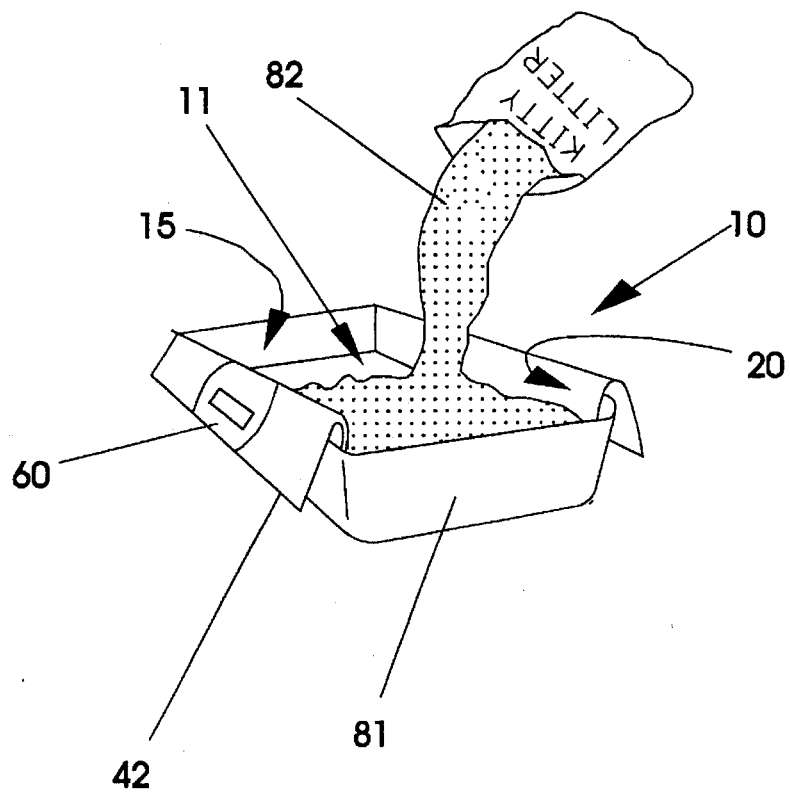
FIG. 8 is a schematic illustration of a litter box liner of the present invention being filled with litter.
Figure 9:
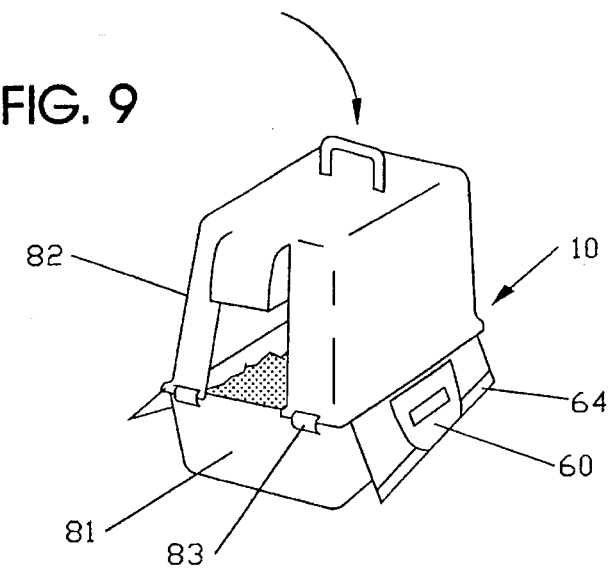
FIG. 9 is a schematic illustration of a litter box liner of the present invention being installed in a litter pan, including a cover, for use.

The use of the liner of the invention is best illustrated in FIGS. 7–11. As shown in FIG. 6, a plurality of liners 10 folded flat are packaged together as a unit 80 to facilitate storage thereof. As shown in FIGS. 7 and 8, one of the liners 10 is opened for use, where it assumes a generally box or pan-shaped configuration, inserted in a litter box 81, and filled with litter 82. If so desired, a cover 82 may be secured to the litter box 81 by means of clips 83 or other securing means for use (FIG. 9). Where the clips 83 are located along the side of the litter box, the liner may be provided with holes or openings, or perforations defining a section that may be removed to provide a hole or opening, along the side wall top edge portion 21. After use, the liner is lifted from the litter box by clasping to the two opposite top panels together so that the bottom panel collapses downward and the liner assumes a generally bag shaped configuration (FIG. 10), and the liner is disposed of properly (FIG. 11).

In a preferred embodiment, bottom panel 11 is about 14 inches long by 10 inches wide; end panels 15 are 5 inches high, ten inches wide at the base thereof, and 12 inches wide along the top edge portion 16 thereof (thereby being trapezoidal in shape); side panels 20 are 14 inches long along the base thereof, 5 inches high, and 16 inches long along top edge portion 21 thereof (thereby also being trapezoidal in shape); and the top panels 40 are 16 inches long by 3 inches high (from fold line 41 to top edge portion 42). These dimensions are not critical to the invention, and the liner can be made in any suitable size, depending upon the shape and configuration of the litter box for which it is intended. The liner can be provided in a plurality of sizes (e.g., small, medium, large) to adapt to a plurality of litter boxes.

The foregoing is illustrative of the present invention, and is not to be construed as limiting thereof. The invention is defined by the following claims, with equivalents of the claims to be included therein.

That which is claimed is:

1. A disposable cat litter box liner formed of flexible sheet material, wherein said flexible sheet material is paper, said liner adapted to assume a generally flat configuration prior to use, a generally box-shaped configuration upon insertion into a cat litter box for holding litter therein, and a generally bag-shaped configuration upon removal from said litter box for disposing of said litter therein, said liner comprising:

a bottom panel having opposite side edge portions and opposite end edge portions;

a pair of opposite end panels foldably connected to said bottom panel end edge portions, each of said opposite end panels terminating at a top edge portion;

a pair of elongate opposite side panels foldably connected to said bottom panel side edge portions, each of said side panels having a top edge portion;

with said side panels and said end panels connected to one another to form a continuous uninterrupted side wall connected to said bottom panel, said wall forming with said bottom panel a receptacle for holding cat litter therein;

fold means associated with said end panels for permitting said liner to be folded into a generally flat configuration; and a pair of elongate opposite top panels, each of said top panels foldably connected to one of said side panels at said side panel top edge portions, with said top panels extending above said side panel top edge portions, so that when said top panels are clasped together and said liner lifted thereby with cat litter in said receptacle, said bottom panel collapses downward, said side panels collapse inward, and said liner assumes a generally bag-shaped configuration.

2. A disposable cat litter box liner according to claim 1, further comprising handle means formed in at least one of said top panels for carrying said litter box liner.

3. A disposable cat litter box liner according to claim 1, further comprising closure means connected to at least one of said top panels for joining said top panels to one another.

4. A disposable cat litter box liner according to claim 1, further comprising rigidifying means associated with at least one of said top panels for facilitating the carrying of said liner when said top panels are clasped together and said liner lifted thereby.

5. A disposable cat litter box liner according to claim 1, wherein said fold means comprise fold lines formed in said end panels.

6. A disposable cat litter box liner according to claim 1, said fold means configured for permitting said liner to be folded with said end panels to overlying said bottom panel and said side panels overlying said bottom panel.

7. A disposable cat litter box liner according to claim 1, wherein said bottom panel is rectangular in shape.

8. A disposable cat litter box liner according to claim 1, wherein said opposite end panels terminate at said end panel top edge portions.

9. A disposable cat litter box liner according to claim 1, wherein said flexible sheet material is recycled paper.

10. A disposable cat litter box liner according to claim 1, wherein said fold means are formed only in said end panels.

11. A disposable cat litter box liner formed of flexible paper, said liner adapted to assume a generally flat configuration prior to use, a generally box-shaped configuration upon insertion into a cat litter box for holding litter therein, and a generally bag-shaped configuration upon removal from said litter box for disposing of said litter therein, said liner comprising:

a bottom panel having opposite side edge portions and opposite end edge portions;

wherein said bottom panel is rectangular in shape;

a pair of opposite end panels foldably connected to said bottom panel end edge portions, each of said opposite end panels terminating at a top edge portion;

a pair of elongate opposite side panels foldably connected to said bottom panel side edge portions, each of said side panels having a top edge portion;

with said side panels and said end panels connected to one another to form a continuous uninterrupted side wall connected to said bottom panel, said wall forming with said bottom panel a receptacle for holding cat litter therein;

wherein said side wall is a generally outwardly sloped side wall;

fold means associated with said end panels for permitting said liner to be folded into a generally flat configuration, said fold means comprising fold lines formed in said end panels; and a pair of elongate opposite top panels, each of said top panels foldably connected to one of said side panels at said side panel top edge portions, with said top panels extending above said side panel top edge portions, so that when said top panels are clasped together and said liner lifted thereby with cat litter in said receptacle, said bottom panel collapses downward, said side panels collapse inward, and said liner assumes a generally bag-shaped configuration.

12. A disposable cat litter box liner according to claim 11, further comprising handle means formed in at least one of said top panels for carrying said litter box liner.

13. A disposable cat litter box liner according to claim 12, further comprising closure means connected to at least one of said top panels for joining said top panels to one another.

14. A disposable cat litter box liner according to claim 13, further comprising rigidifying means associated with at least one of said top panels for facilitating the carrying of said liner when said top panels are clasped together and said liner lifted thereby.

15. A disposable cat litter box liner according to claim 14, wherein said rigidifying means comprises a rigidifying member connected to each of said top panels.

16. A disposable cat litter box liner according to claim 15, said fold means configured for permitting said liner to be folded with said end panels to overlying said bottom panel and said side panels overlying said bottom panel.

17. A disposable cat litter box liner according to claim 16, wherein said opposite end panels terminate at said end panel top edge portions.

18. A disposable cat litter box liner according to claim 17, wherein said end panels are trapezoidal in shape.

19. A disposable cat litter box liner according to claim 18, wherein said side panels are trapezoidal in shape.

20. A disposable cat litter box liner according to claim 19, wherein said paper is recycled paper.

21. A disposable cat litter box liner according to claim 11, wherein said fold means are formed only in said end panels.

* * * * *